United States Patent
Meiswinkel et al.

(10) Patent No.: US 11,511,417 B1
(45) Date of Patent: Nov. 29, 2022

(54) CONVEYANCE MODULATION BASED ON FRAGILITY RATINGS

(71) Applicant: Amazon Technologies, Inc., Seattle, WA (US)

(72) Inventors: Kent Belden Meiswinkel, Seattle, WA (US); William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 16/876,982

(22) Filed: May 18, 2020

(51) Int. Cl.
*B25J 9/16* (2006.01)
*B25J 13/08* (2006.01)
*B65G 47/91* (2006.01)
*B65G 1/137* (2006.01)

(52) U.S. Cl.
CPC ........... *B25J 9/1651* (2013.01); *B25J 9/1633* (2013.01); *B25J 9/1653* (2013.01); *B25J 9/1664* (2013.01); *B25J 9/1679* (2013.01); *B25J 13/085* (2013.01); *B25J 13/087* (2013.01); *B25J 13/088* (2013.01); *B65G 1/1376* (2013.01); *B65G 47/917* (2013.01); *B65G 2203/0216* (2013.01); *B65G 2203/0258* (2013.01); *B65G 2203/0291* (2013.01); *B65G 2203/042* (2013.01); *B65G 2811/0621* (2013.01); *B65G 2811/0663* (2013.01)

(58) Field of Classification Search
CPC ...... B25J 9/1651; B25J 9/1633; B25J 9/1653; B25J 9/1664; B25J 9/1679; B25J 13/085; B25J 13/087; B25J 13/088; B65G 1/1376; B65G 47/917; B65G 2203/0216; B65G 2203/0258; B65G 2203/0291; B65G 2203/042; B65G 2811/0621; B65G 2811/0663
See application file for complete search history.

(56) References Cited

U.S. PATENT DOCUMENTS

| | | | | |
|---|---|---|---|---|
| 6,721,762 | B1 * | 4/2004 | Levine | G06Q 10/04 707/999.102 |
| 9,536,216 | B1 * | 1/2017 | Lisso | G01C 21/00 |
| 10,647,528 | B1 * | 5/2020 | Diankov | B65G 61/00 |
| 10,696,493 | B1 * | 6/2020 | Diankov | B65B 57/00 |
| 10,696,494 | B1 * | 6/2020 | Diankov | B65B 57/00 |
| 2001/0017023 | A1 * | 8/2001 | Armington | B65B 55/20 53/472 |
| 2003/0200111 | A1 * | 10/2003 | Damji | G06Q 10/08345 705/335 |
| 2017/0061349 | A1 * | 3/2017 | Zhang | G06Q 10/087 |
| 2020/0130935 | A1 * | 4/2020 | Wagner | B65G 1/1373 |
| 2020/0262658 | A1 * | 8/2020 | Kline | B65G 43/10 |
| 2020/0311656 | A1 * | 10/2020 | Cole | G06T 17/00 |
| 2021/0129334 | A1 * | 5/2021 | Kanunikov | G06T 7/62 |

* cited by examiner

Primary Examiner — Thomas Randazzo
(74) *Attorney, Agent, or Firm* — Kilpatrick Townsend & Stockton LLP

(57) ABSTRACT

A system for moving items in a facility may be described herein. The system may instruct components of the system to move the items at different speeds or velocities based on an item's fragility rating. A fragility rating may indicate an amount of force that an item withstands prior to damaging the item. A fragility rating for an item may be determined based on known fragility ratings of items with similar item metrics.

20 Claims, 11 Drawing Sheets

CONVEYANCE MODULATION BASED ON FRAGILITY RATINGS

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space and equipment can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which.

DETAILED DESCRIPTION

Figure 1:
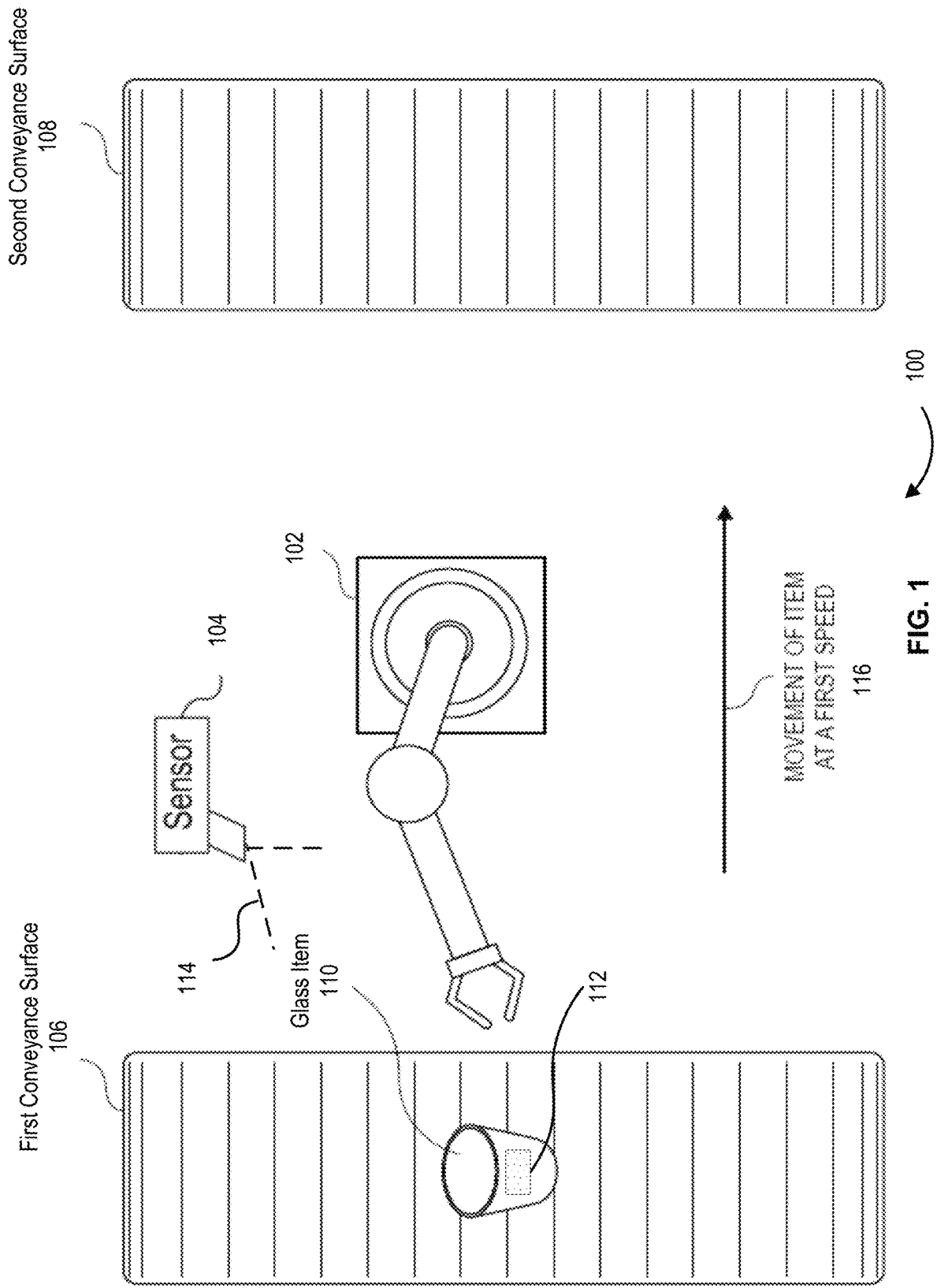
FIG. 1 illustrates an inventory conveyance system that includes a robotic manipulator and one or more conveyance surfaces, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory conveyance system that implements inventory conveyance mechanisms for moving or transferring inventory/items with an associated fragility rating. In embodiments, a fragility rating is a value that represents an amount of force that an individual item can withstand prior to damaging the item. A fragility rating can also represent an impulse threshold for an item. Some items, given their inherit proprieties or item metrics, are able to withstand a greater force, travel at an increased speed, and withstand a greater velocity of movement than other items. For example, a lightbulb moved through a facility at 30 miles per hour (MPH) along one or more conveyance mechanisms would likely be damaged if not completely destroyed by the time it reached a target destination within the facility. However, a baseball conveyed under similar conditions would likely not be damaged by the time it reached the target destination. The inventory conveyance system may be operable to transfer or move inventory/items from one location to another location within a facility and via one or more conveyance mechanisms using robotic manipulators, actuators, and sorting apparatuses. A conveyance mechanism may be referred to as a conveyance surface. In embodiments, conveyance mechanisms may include robotic manipulators, conveyors, rollers, actuators, sorting apparatuses, flaps, air powered conveyance mechanisms, pneumatic conveyance mechanisms, inductors, or any suitable component configured to move an item in an inventory conveyance system. In accordance with at least one embodiment, the inventory conveyance system may utilize one or more sensors that interact with a machine-readable code of an item, which comprises a determined fragility rating of the item, to modulate a mode of operation for the robotic manipulators, actuators, one or more conveyance mechanisms, or other components of the inventory conveyance system. By modulating the mode of operation, state, or speed of movement of the components of the inventory conveyance system, tasks associated with an item (such as moving an item from a first location in a facility to another location within the facility) can be efficiently completed while maintaining the integrity of the item. Conventional inventory management systems or inventory conveyance systems may utilize components to move items in a facility which utilize static modes of operation or speeds without taking into account an individual item's capability to travel at an increased speed or withstand more force exerted upon it. By utilizing the techniques described herein, completion of a task related to moving an item or transferring an item from one location in a facility of the inventory conveyance system to another location in the facility may decrease tardiness.

In accordance with at least one embodiment, items of a facility of the inventory conveyance system may be associated with a machine-readable code. In embodiments, the machine-readable code may include the item's determined fragility rating. A fragility rating may be a value, an alpha-numeric value, a range of values, a tolerance band of values, or a subjective term such as "fragile" or "durable." The machine-readable code may include a barcode, a quick response (QR) code, a near field communication (NFC) receive or transmitter, a Bluetooth base, an optical code, a radio frequency identification (RFID) tag, or other wireless communication transmitter or receiver. Sensors of the inventory conveyance system may interact with the machine-readable code of an item to transmit information about the fragility rating of an item to a computer system that instructs modulation of components of the inventory conveyance system to complete a task related to the item, such as changing the speed at which a robotic manipulator moves said item from one conveyance mechanism to another conveyance mechanism. The machine-readable code may be a unique identifier.

In embodiments, a fragility rating for an item may be determined based on one or more tests or experiments such as a drop test, a Charpy impact test, or any suitable method for calculating a jerk or jolt for an item that results in damage to the item. A drop test may refer to a test which evaluates damage inflicted on an item by dropping the item from different heights. A Charpy impact test may include a test which involves striking an item with a controlled weight pendulum swing from a set height that measures an amount of energy absorbed by the item during collision of the weight and item. A computer system of the inventory conveyance system may obtain the data from the experiments and determine an appropriate fragility rating(s) for the item. The computer system of the inventory conveyance system may maintain and update a database for items of a facility which includes fragility ratings of items mapped to item identifiers and other information about an item such as item metrics for the item (e.g., dimensions, weight, packaging, material composition, etc.). In accordance with at least one embodiment, the computer system of the inventory conveyance system may determine a fragility rating for an item that has not been tested or experimented with in order to obtain test data that indicates actual values which may be used to determine the item's fragility rating. In embodiments, item metrics for the newly received item may be compared to item metrics of items whose fragility rating is already known. The computer system may temporarily assign the fragility rating to the newly received item until experiments and tests may be conducted with the newly received item. In embodiments, a supervised machine learning algorithm may be used to determine the fragility rating of an item that does not have a fragility rating already assigned or determined. In embodiments, fragility ratings may be updated based on newly received information or data. For example, items may be repackaged such that the force exerted on an item before damaging the item may change.

Referring now to the drawings in which like-referenced numerals and/or names may refer to like elements, FIG. 1 illustrates an inventory conveyance system that includes a robotic manipulator and one or more conveyance surfaces (conveyance mechanisms), in accordance with embodiments. FIG. 1 depicts inventory conveyance system 100 which may include a robotic manipulator 102, a sensor 104, a first conveyance surface 106, a second conveyance surface 108, and a glass item 110. The glass item 110 may include a machine-readable code 112 that includes information about the glass item 110 including a fragility rating for the glass item 110. The sensor 104 may be configured to obtain or otherwise interact 114 with the machine-readable code 112 of glass item 110. For example, the machine-readable code 112 may be an RFID tag and sensor 104 may be an RFID reader. FIG. 1 depicts first conveyance surface 106 and second conveyance surface 108 which may be examples of one or more conveyance surfaces included in a facility by which items are moved throughout the facility according to one or more tasks. The first conveyance surface 106 and second conveyance surface 108 may be stationary or moving surfaces. In embodiments, first conveyance surface 106 and second conveyance surface 108 may include one or more driving rollers (not pictured) that provide momentum to items, such as glass item 110, to propel the item along the first conveyance surface 106 and second conveyance surface 108.

In embodiments, the first conveyance surface 106 and second conveyance surface 108 may be part of one or more conveyance mechanisms utilized by one or more conveyance routes as maintained by a computer system (not pictured) of the inventory conveyance system. FIG. 1 depicts the robotic manipulator 102 utilizing one or more end effectors moving glass item 110 from first conveyance surface 106 to second conveyance surface 108 at a first speed 116. In embodiments, the first speed 116 that the robotic manipulator 102 utilizes to move the glass item 110 from the first conveyance surface 106 to the second conveyance surface 108 is based on the fragility rating of the glass item 110 as encoded or included in the machine-readable code 112. The first speed 116 may be of a certain velocity that is below a threshold such as to exert a certain amount of force or impulse that would cause damage to the glass item 110 as indicated by the fragility rating of the glass item 110 as indicated by the machine-readable code 112. As can be envisioned, the first speed 116 for moving the glass item 110 may be less than a speed utilized for moving a more durable item, such as a hammer from the first conveyance surface 106 to the second conveyance surface 108. A computer system of the inventory conveyance system 100 may receive the information of the machine-readable code 112 of glass item 110 from the interaction or scan 114 by the sensor 104 and determine an appropriate speed or velocity for the robotic manipulator 102 to move the glass item 110 within the facility. The computer may send instructions to the robotic manipulator to instruct movement at the first speed 116 or modulate from a different speed to the first speed 116 when moving the glass item 110 to the second conveyance surface 108 from first conveyance surface 106.

Figure 2:
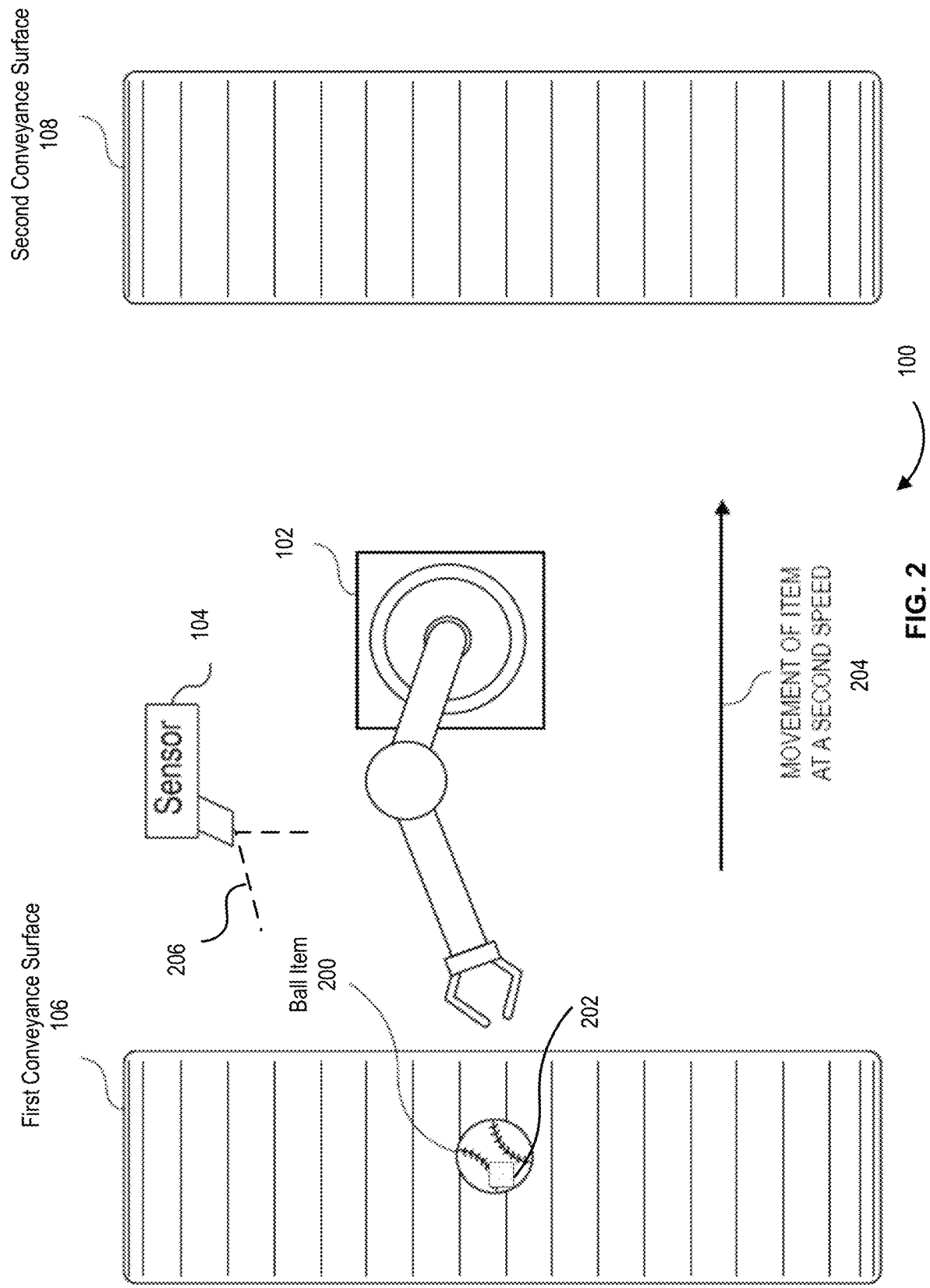
FIG. 2 illustrates an inventory conveyance system that includes a robotic manipulator and one or more conveyance surfaces, in accordance with embodiments.

FIG. 2 illustrates an inventory conveyance system that includes a robotic manipulator and one or more conveyance surfaces (conveyance mechanisms), in accordance with embodiments. FIG. 2 depicts inventory conveyance system 100 including robotic manipulator 102, sensor 104, first conveyance surface 106, and second conveyance surface 108. Similar to FIG. 1, the inventory conveyance system may utilize components 102, 104, 106, and 108 to move an item within a facility. For example, FIG. 2 depicts ball item 200 with associated machine-readable code 202 being moved by robotic manipulator 102 at a second speed 204 from first conveyance surface 106 to second conveyance surface 108. In embodiments, the second speed 204 may be faster or exert greater force upon ball item 200 than first speed 116 of FIG. 1. As such, robotic manipulator 102 may be instructed to modulate speed or change state in accordance with moving a more durable item, such as ball item 200.

By changing the speed at which an item is moved throughout a facility via one or more conveyance mechanisms, time to complete a task related to the item may be reduced while still ensuring that no damage occurs to the items during completion of said task. The computer system (not pictured) of inventory conveyance system 100 may receive or otherwise obtain the fragility rating for ball item 200 based on the sensor 104 interacting 206 or otherwise scanning the machine-readable code 202. In response to identifying that the ball item 200 has a different fragility rating than the glass item 110, the computer system may instruct robotic manipulator 102 to move the ball item 200 faster from the first conveyance surface 106 to second conveyance surface 108. For example, machine-readable code 202 may be a QR code that sensor 104 scans with a QR code reader or takes an image which captures a QR code that includes information indicating the fragility rating for ball item 200.

Figure 3:
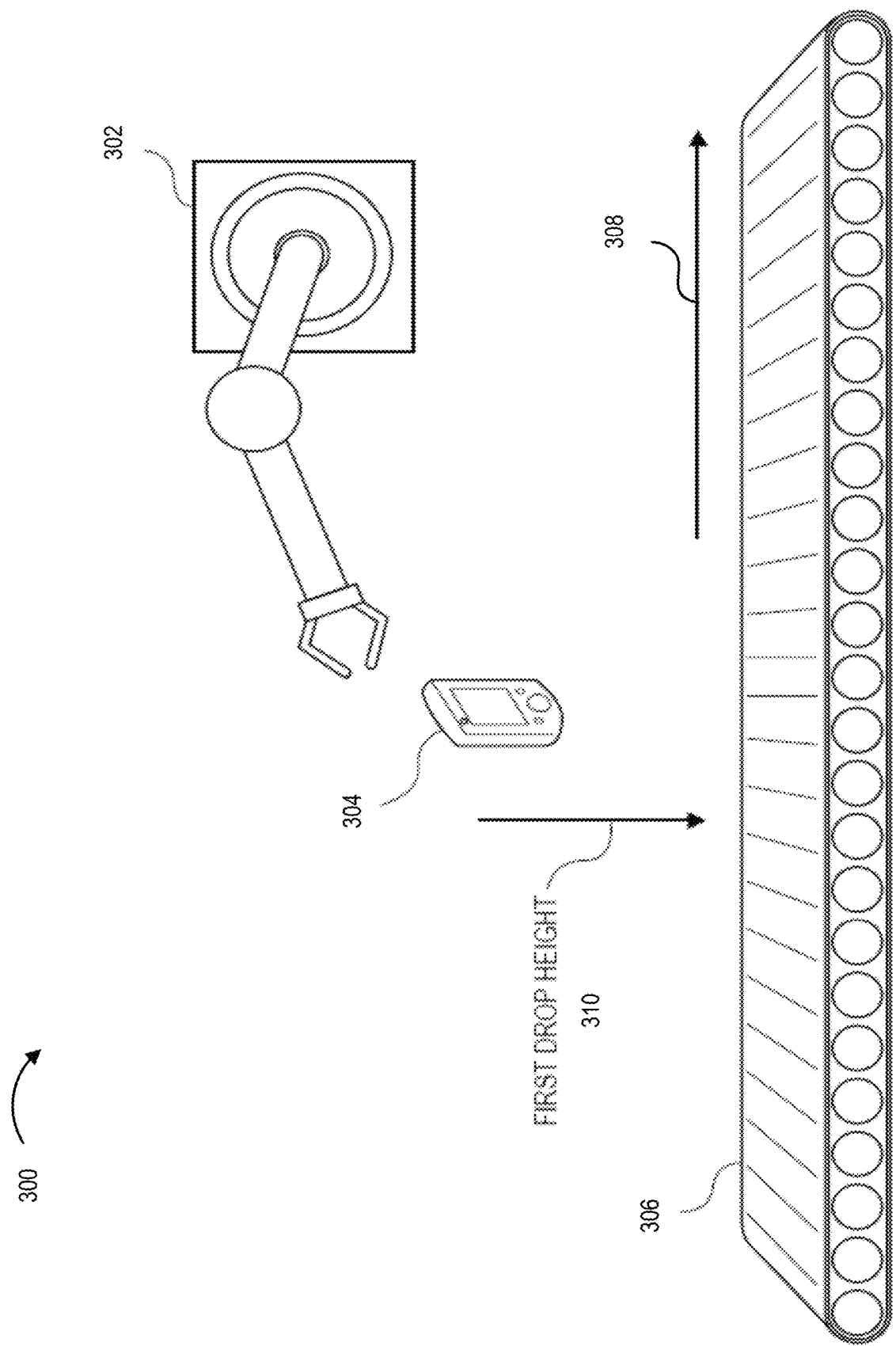
FIG. 3 illustrates an inventory conveyance system that includes a robotic manipulator and a conveyance surface, in accordance with embodiments.

FIG. 3 illustrates an inventory conveyance system that includes a robotic manipulator and a conveyance surface (conveyance mechanism), in accordance with embodiments. FIG. 3 depicts inventory conveyance system 300 which includes robotic manipulator 302, item 304, and conveyance mechanism 306. Conveyance mechanism 306 may be moving in a unilateral direction 308 in accordance with a conveyance route for completing a task related to item 304 such as moving item 304 from a first location to a second location within a facility of the inventory conveyance system 300. Although FIGS. 3 and 4 depict unilateral movement of conveyance mechanisms within inventory conveyance system 300 it should be understood that the conveyance mechanisms of the inventory conveyance system may be configured to change direction or be configured to utilize bi-lateral movement in response to instructions from a computer system (not pictured) of the inventory conveyance system 300.

As illustrated in FIG. 3, robotic manipulator 302 may be instructed, by a computer system of the inventory conveyance system 300, to drop item 304 onto a conveyance mechanism, such as conveyance mechanism 306, from a first drop height 310. In embodiments, the computer system of the inventory conveyance system 300 may determine the first drop height 310 for item 304 based on a corresponding fragility rating for the item 304. For example, the first drop height 310 may be represent less of a distance drop to conveyance mechanism 306 than for a more durable item as illustrated in FIG. 4 described below. The computer system may receive or otherwise obtain the fragility rating of the item 304 from a machine-readable code of item 304 and determine the first drop height 310 so as not to exceed a threshold of force or impulse as indicated by the fragility rating of item 304. The machine-readable code of item 304 may be obtained by a sensor (not pictured) of inventory conveyance system 300. In embodiments, the sensor may be integrated or otherwise associated with robotic manipulator 302.

Figure 4:
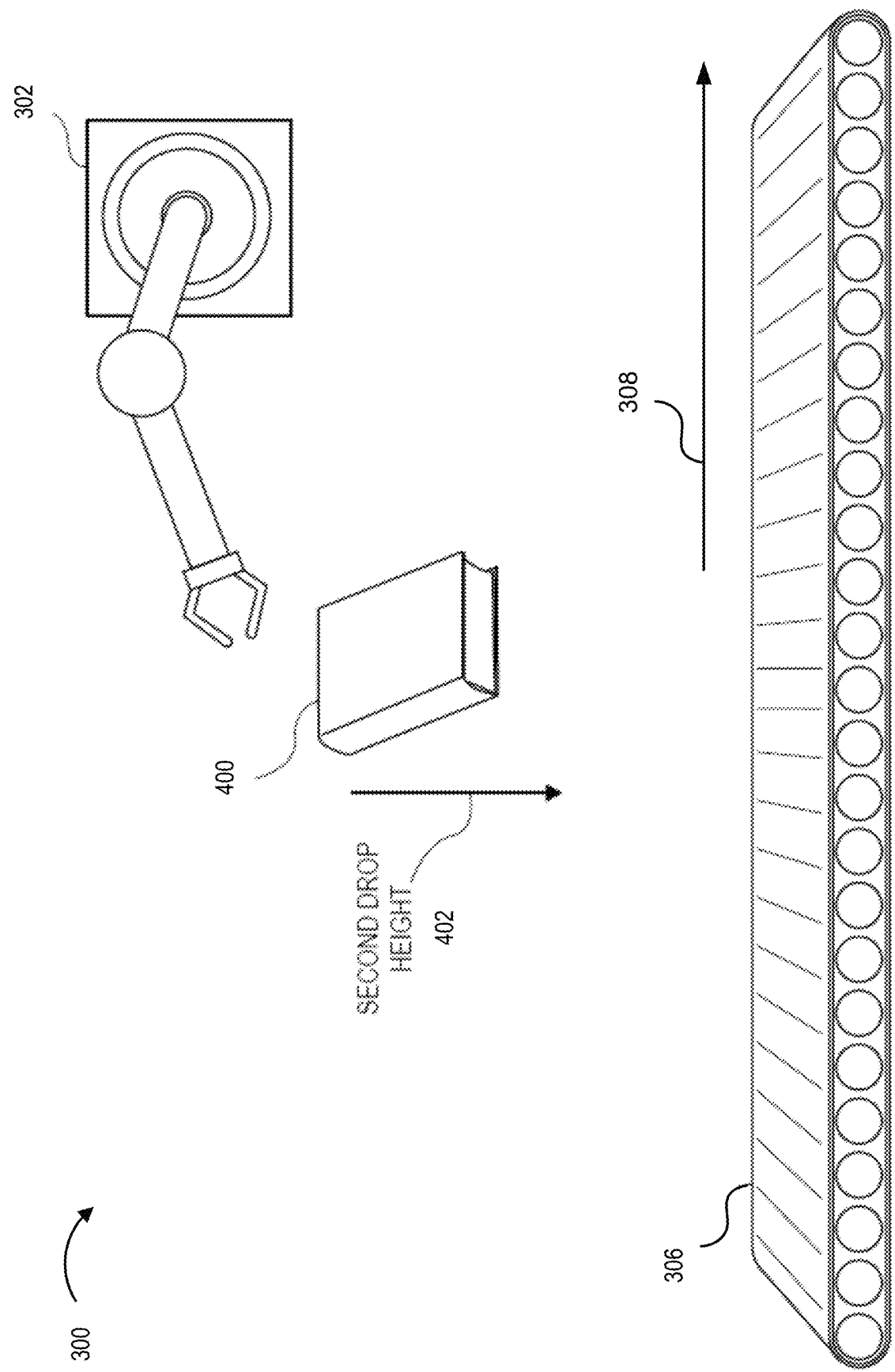
FIG. 4 illustrates an inventory conveyance system that includes a robotic manipulator and a conveyance surface, in accordance with embodiments.

FIG. 4 illustrates an inventory conveyance system that includes a robotic manipulator and a conveyance surface (conveyance mechanism), in accordance with embodiments. FIG. 4 depicts inventory conveyance system utilizing a different drop height than first drop height 310 of FIG. 3 based on interacting with a more durable item, such as item 400 that represents a book. FIG. 4 depicts the robotic manipulator 302 of inventory conveyance system 300 utilizing second drop height 402 to move or drop item 400 to conveyance mechanism 306. As depicted in FIG. 4, the second drop height 402 represents a greater distance between the robotic manipulator 302 and conveyance mechanism 300 as item 400 may be more durable and thus a greater drop height (e.g., second drop height 402) may be utilized to more efficiently move items in a facility. In accordance with at least one embodiment, a computer system of inventory conveyance system 300 may receive or otherwise obtain the fragility rating for item 400 to determine the second drop height 402. The computer system may instruct the robotic manipulator 302 to change states, modulate, or utilize a different height than previously utilized to move a previous item to conveyance mechanism 306. By utilizing a different drop height, the robotic manipulator 302 may be able to move on to grasping the next item for moving to the conveyance mechanism 306 instead of moving to a default height prior to releasing an item for dropping onto the conveyance mechanism 306 without consideration of the item's fragility or durability.

Figure 5:
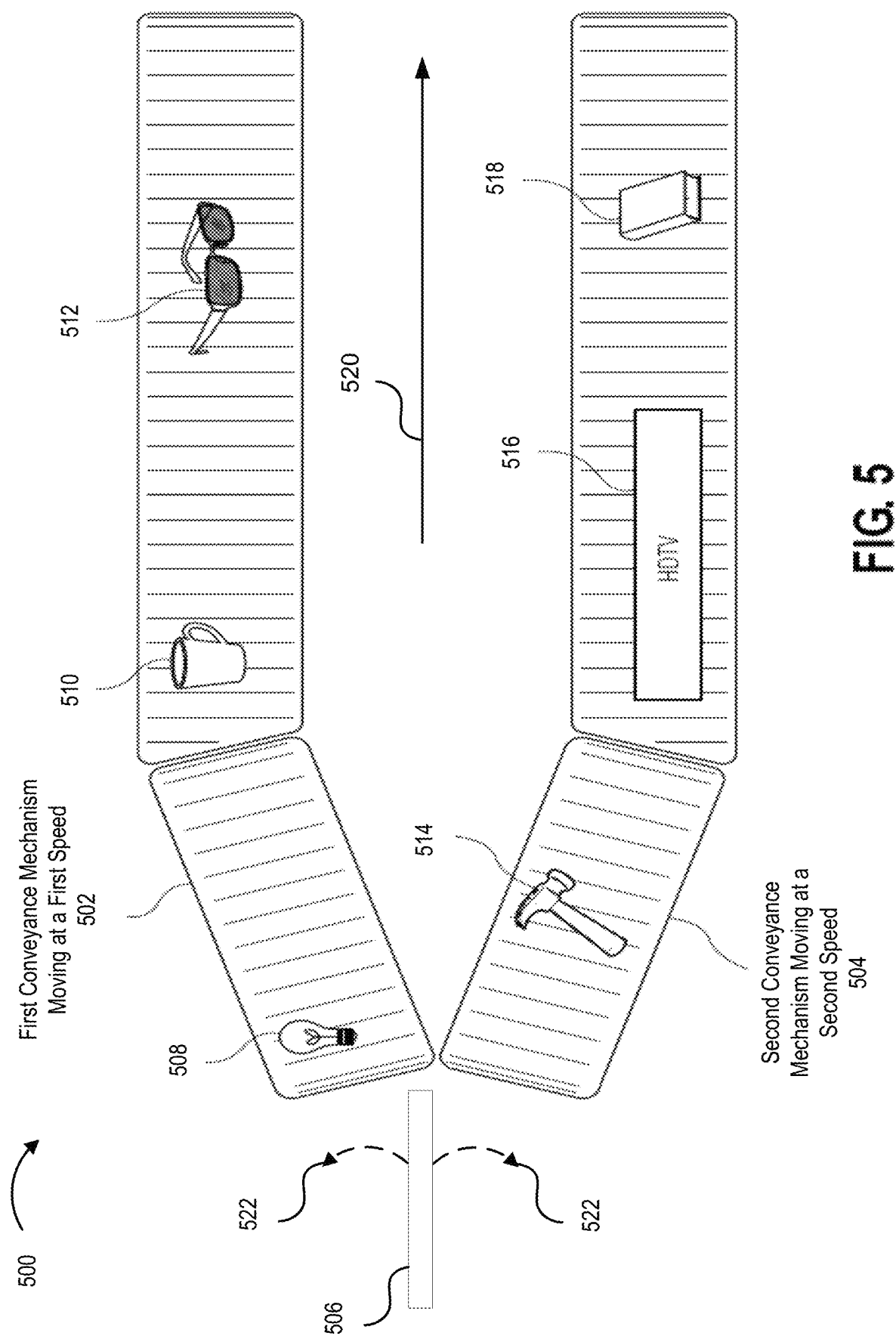
FIG. 5 illustrates an inventory conveyance system that includes a sorting apparatus and one or more conveyance surfaces, in accordance with embodiments.

FIG. 5 illustrates an inventory conveyance system that includes a sorting apparatus and one or more conveyance surfaces (conveyance mechanisms), in accordance with embodiments. FIG. 5 depicts inventory conveyance system 500 that includes a first conveyance mechanism moving at a first speed 502, a second conveyance mechanism moving at a second speed 504, and a sorting apparatus 506. In embodiments, the first conveyance mechanism moving at a first speed 502 may be one or more of the conveyance mechanisms utilized within a particular conveyance route of the inventory conveyance system 500. The first conveyance mechanism moving at a first speed 502 may be part of a conveyance route instructed to move at low speed in order to convey more fragile items such as lightbulb item 508, coffee mug 510, and sunglasses 512. In embodiments, the second conveyance mechanism moving at a second speed 504 may be one or more of the conveyance mechanisms utilized within a particular conveyance route of the inventory conveyance system 500 that is different than the conveyance route that includes the first conveyance mechanism moving at the first speed 502. The second conveyance mechanism moving at a second speed 502 may be part of a conveyance route instructed to move at higher speeds, with respect to other conveyance mechanisms and conveyance routes within the inventory conveyance system 500, in order to convey more durable items such as a hammer item 514, a well packaged television 516, and a book 518.

The first conveyance mechanism moving at first speed 502 and second conveyance mechanism moving at a second speed 504 may be moving in a unilateral direction 520 in accordance with a conveyance route for completing a task related to items 508-518 such as moving items 508-518 from a first location to a second location within a facility of the inventory conveyance system 500. The first conveyance mechanism moving at a first speed 502 and the second conveyance mechanism moving at a second speed 504 may also be configured to move in a bi-lateral direction to complete tasks related to items 508-518 in inventory conveyance system 500. Although FIG. 5 depicts two conveyance mechanisms and a single sorting apparatus, conveyance routes determined by the computer system of the inventory conveyance system 500 may utilize a plurality of conveyance mechanisms, conveyance routes, sorting apparatuses, robotic manipulators, sensors, and other components. The conveyance routes may include singular paths that do not deviate from an original location to a destination location within the inventory conveyance system 500. Conveyance routes may also intersect with other conveyance routes, which may or may not utilize components moving at different speeds according to instructions from the computer system and information about an item's fragility rating, run parallel to other conveyance routes, or utilize unique routes depending on information about the item (e.g., item metrics and/or an item's fragility rating) and the current task for the item. FIG. 5 depicts sorting apparatus 506 utilizing several degrees of motion 522 to form a channel or guide items, such as items 508-512 to one conveyance mechanism (first conveyance mechanism moving at a first speed 502) while prohibiting movement of the same items 508-512 from transferring or moving onto another conveyance mechanism that may be part of another conveyance route, such as second conveyance mechanism moving at a second speed 504. The sorting apparatus 506 may be instructed to move, by the computer system of the inventory conveyance system 500, to define a channel which guides or funnels items to a particular conveyance route in the inventory conveyance system 500.

Although FIGS. 1-5 depict items not stored in an inventory container the current disclosure is not limited to interacting with items that have associated fragility ratings. Embodiments disclosed herein can interact, guide, and convey inventory containers that have associated fragility ratings encoded in a machine-readable code. In embodiments, the inventory conveyance system may receive or obtain from sensors information about a plurality of items stored in an inventory container including fragility ratings for each of the items within the inventory container. For example, the computer system may identify the lowest fragility rating corresponding to the most fragile item in an inventory container and instruct movement, a change of state, or operation of one or more components within the inventory conveyance system 500 to interact with the inventory container to move the inventory container efficiently but without damaging the items within the inventory container.

Figure 6:
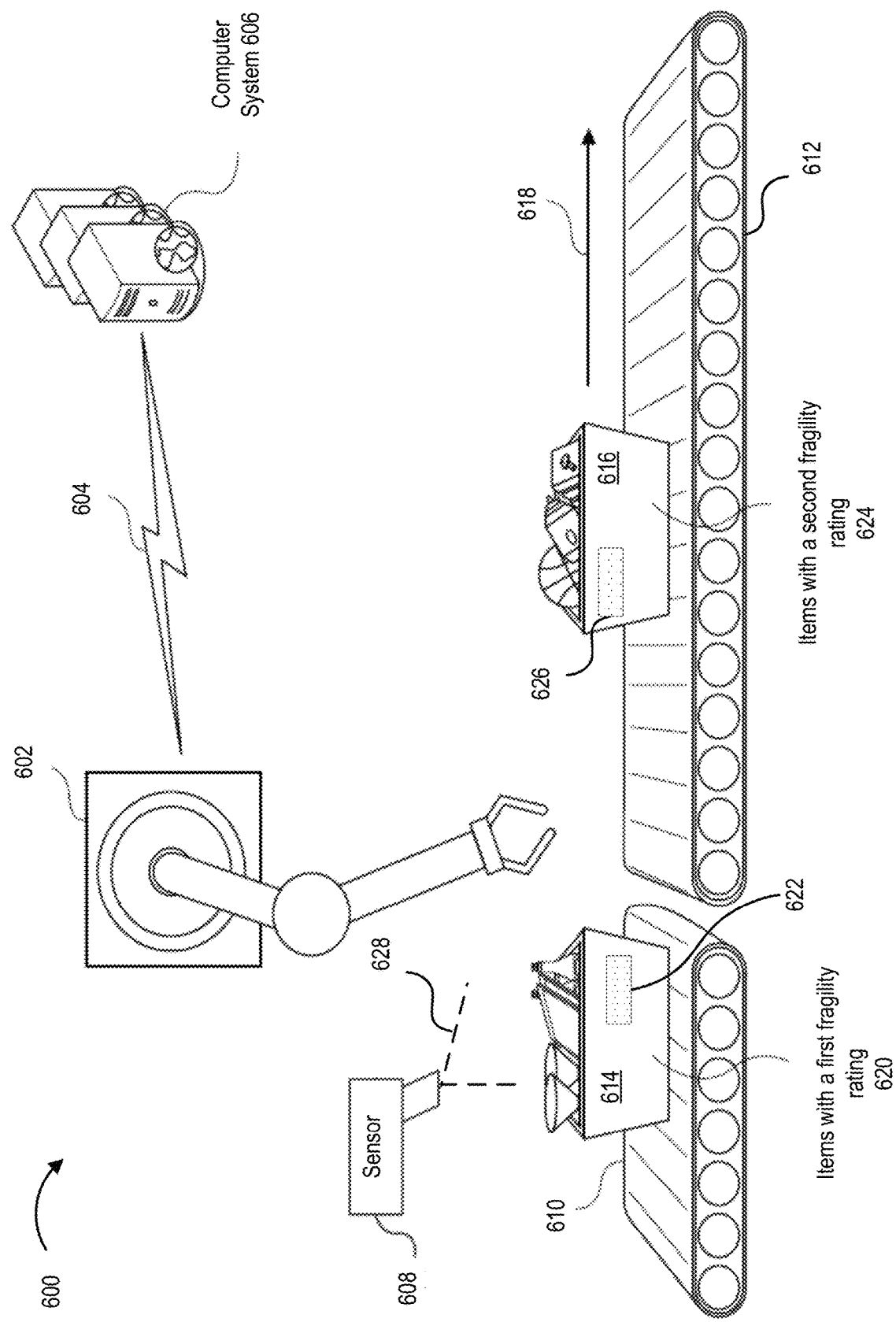
FIG. 6 illustrates an inventory conveyance system that includes a robotic manipulator in communication with a server computer, and one or more conveyance surfaces, in accordance with embodiments.

FIG. 6 illustrates an inventory conveyance system that includes a robotic manipulator in communication with a server computer, and one or more conveyance surfaces (conveyance mechanisms), in accordance with embodiments. FIG. 6 depicts inventory conveyance system 600 including robotic manipulator 602 in communication 604 with computer system 606. The inventory conveyance system 600 also includes a sensor 608, and conveyance mechanisms 610 and 612. The conveyance mechanisms 610 and 612 and robotic manipulator 602 may move or transfer items in inventory containers 614 and 616 in a unilateral direction 618 to complete a task related to the items such as moving the items from one location to another location within the inventory conveyance system 600. In embodiments, inventory containers 614 and 616 may include packaging for an item that is supplied by a vendor, producer, or supplier of the item, which can be referred to as a ship in own container (SIOC). Inventory container 614 may include items with a first fragility rating 620 and be associated with a machine-readable code 622. Inventory container 616 may include items with a second fragility rating 624 and be associated with a machine-readable code 626. In embodiments, the machine-readable code 622 may include a fragility rating for the contents of the inventory container 614. For example, the items with a first fragility rating 620 stored in inventory container 614 may correspond to fragile items such as wine glasses and window frames. The machine-readable code 622 may include information about the items including each item's fragility rating or a summary fragility rating for the items in inventory container 614 that represents the most fragile item currently stored in inventory container 614.

In accordance with at least one embodiment, the computer system 606 may receive information about the inventory container 614 and items stored therein via the sensor 608 interacting 628 with the machine-readable code 622. The sensor may be in communication with the computer system 606 directly or via the robotic manipulator 602. In embodiments, components of inventory conveyance system 600 may utilize different modes, states, or speeds to move items or inventory containers within a facility to complete a task associated with the items or inventory containers. For example, the computer system 606 may instruct conveyance mechanism 612 to move at a certain speed (e.g., 15 MPH) to move inventory container 616 based on receiving or obtaining information about the items with a second fragility rating 624 via the sensor 608 interacting with the machine-readable code 626. The computer system 606 may receive information about an upcoming inventory container, such as inventory container 614 that is intended to transfer or move from conveyance mechanism 610 to conveyance mechanism 612. The computer system 606 may be configured to determine a queue time that the robotic manipulator 602 waits to expire prior to transferring the inventory container 614 from the conveyance mechanism 610 to the conveyance mechanism 612.

In embodiments, the queue time generated by the computer system 606 and which is either transmitted to components of the inventory conveyance system or serves as a basis for generating instructions which modulate components of the inventory conveyance system may serve to ensure that said components are given the appropriate amount of time to ramp up or down modulation, speed, or state to ensure certain items are not damaged. For example, as previously described, conveyance mechanism 612 may be moving at a certain speed that is in accordance with moving more durable items such as items with a second fragility rating 624 in inventory container 616. For illustrative purposes, inventory container 614 may store more fragile items such as items with a first fragility rating. Were the robotic manipulator 602 to transfer the inventory container 614 from the conveyance mechanism 610, which may be stationary or moving at a slow speed, to the conveyance mechanism 612 without enabling the actuators, controls, or other mechanisms which control the speed of conveyance mechanism 612 to slow down, the items within inventory container 614 may be damaged or destroyed. In accordance with at least one embodiment, the computer system 606 may receive or obtain information, via sensor 608 or other sensors not pictured, of the inventory containers, conveyance mechanisms, fragility ratings of items, and determine an appropriate queue time that enables the components of the inventory conveyance system 600 to modulate or obtain a certain state, mode, or speed to avoid damaging or destroying items while completing a task related to said items.

Figure 7:
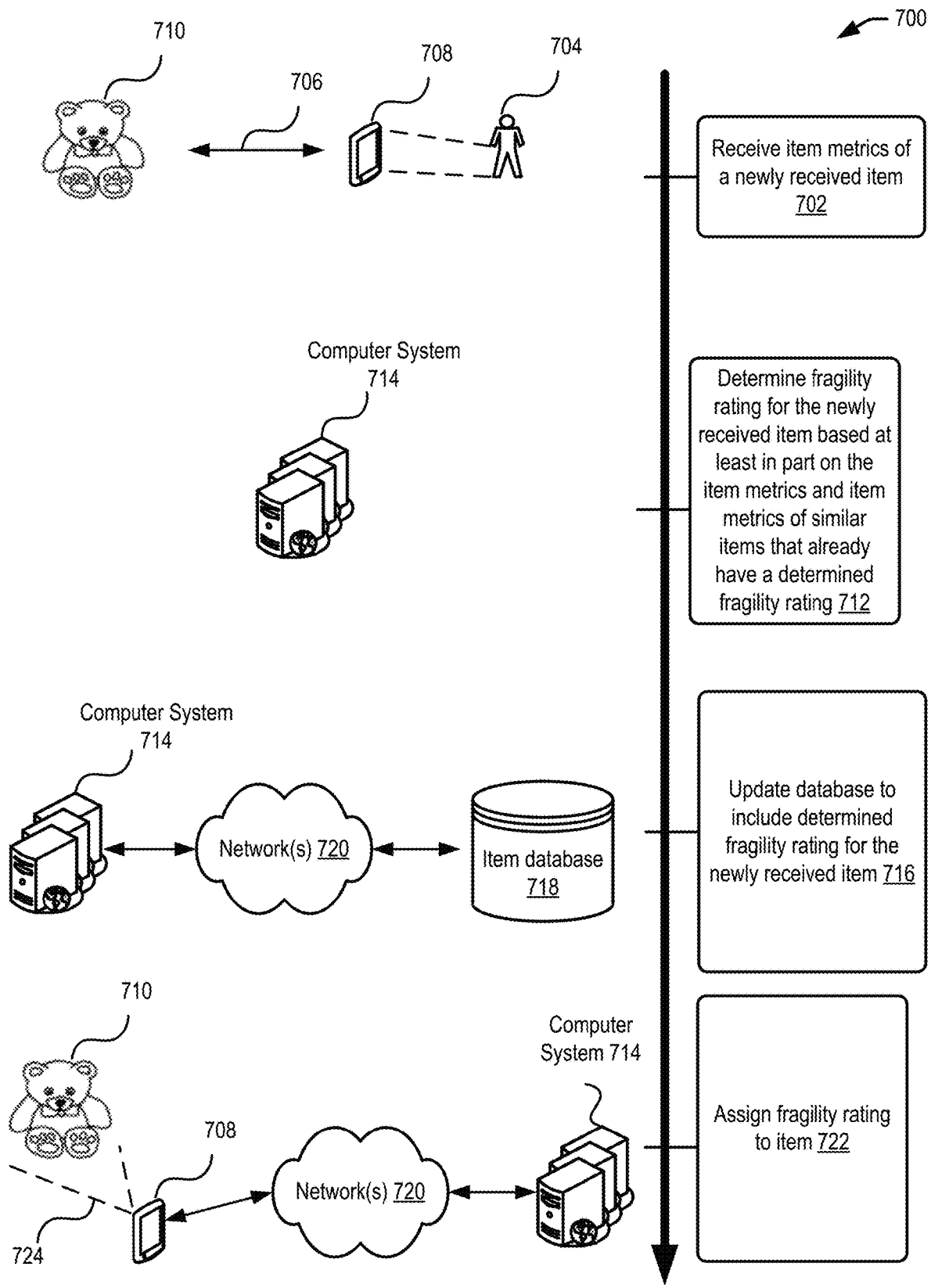
FIG. 7 illustrates an example work flow for an inventory conveyance feature, in accordance with embodiments.

FIG. 7 illustrates an example work flow for an inventory conveyance feature, in accordance with embodiments. In workflow 700 of FIG. 7, item metrics of a newly received item may be received at 702. For example, an associate 704 of the facility may interact 706, via a user device 708, with a new item 710. The associate 704 may use the user device 708 to interact 706 with the new item 710 by scanning, reading, or otherwise obtaining information that indicates the item metrics for the newly received item. In embodiments, the item metrics may include a weight of an item, dimensions of the item, material composition of the item, packaging of the item, an item category of the item, or a density of the item. In embodiments, the user device 708 may configured to obtain the item metrics for the item 710 by interacting 706 with the item 710 via one or more sensors, cameras, or other suitable technology. In embodiments, the newly received item, 710, may not be associated with a fragility rating.

The workflow 700 may include determining a fragility rating for the newly received item based at least in part on the item metrics and item metrics of similar items that already have a determined fragility rating at 712. For example, a computer system, such as computer system 714, may maintain first information about a plurality of items including a fragility rating for each item. The computer system 714 may maintain second information about the plurality of items including item metrics for the plurality of items. In accordance with at least one embodiment, the computer system 714 may be configured to determine the fragility rating for the new item based on a comparison of the item metrics for the new item to items with similar item metrics and their corresponding fragility ratings. The workflow 700 may include updating a database to include determined fragility rating for the newly received item at 716. For example, the computer system 714 may be in communication with an item database 718 via networks 720.

The item database 718 may be configured to maintain one or more records that associate information about an item together or map information or identification and utilization during a conveyance process for moving the corresponding item. For example, item database 718 may be updated to reflect newly obtained item metrics for an item as well as newly determined fragility ratings for an item. In embodiments, the fragility rating determined for a new item may be a temporary fragility rating that is updated upon determining an actual fragility rating for the item based on one or more tests as described herein. The information determined from conducting tests or experiments to determine the amount of force that the newly received item can withstand prior to damage may be referred to as test data. The workflow 700 includes assigning the fragility rating to the newly received item at 722. For example, the computer system 714 may instruct, via networks 720, the user device 708 to print 724 or otherwise associate a machine-readable code that comprises the determined fragility rating to the item 710. In embodiments, the computer system 714 may generate and transmit instructions for storing items with similar fragility ratings in a same location of a facility. Item orders received by the facility and/or computer system 714 may group items with similar fragility ratings for moving or transferring to different areas of the facility to fulfill the item orders.

Figure 8:
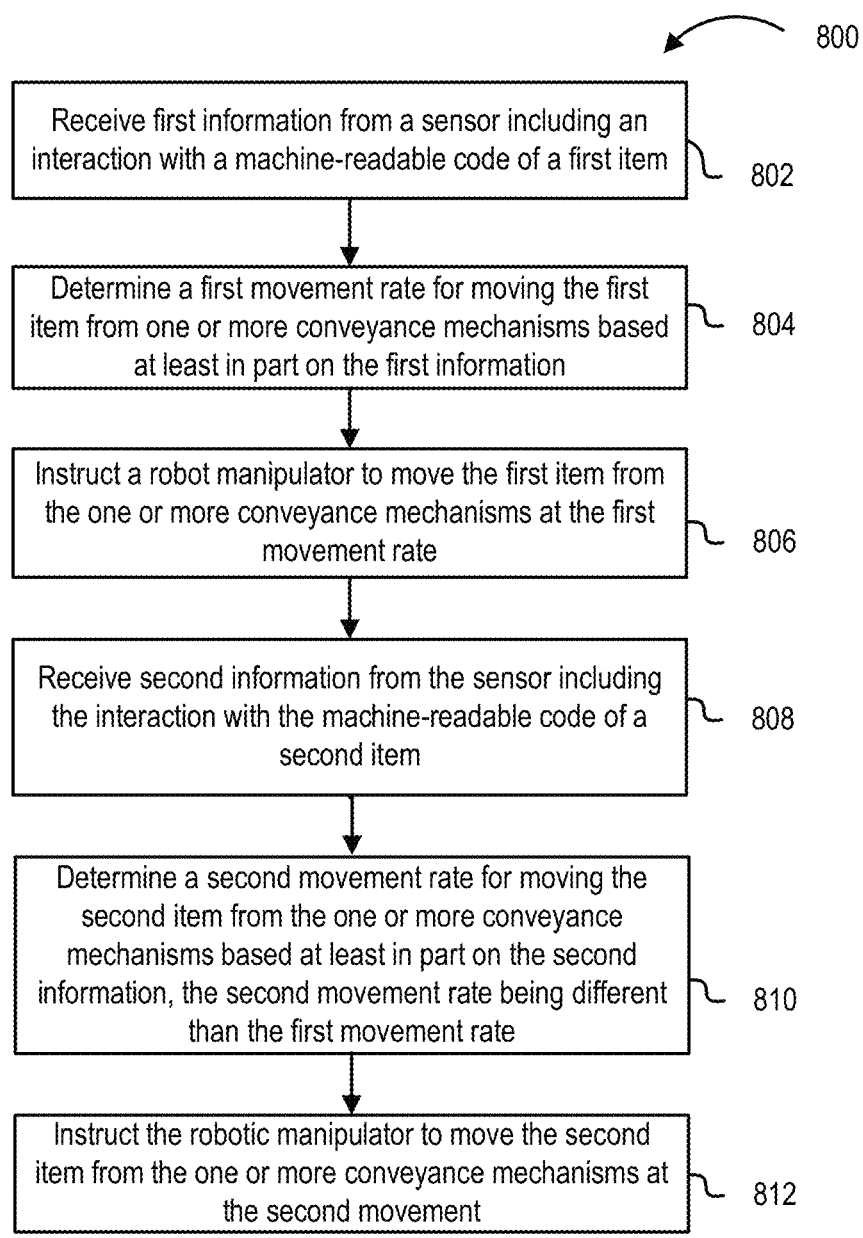
FIG. 8 illustrates an example flow diagram for an inventory conveyance feature, in accordance with embodiments.
Figure 9:
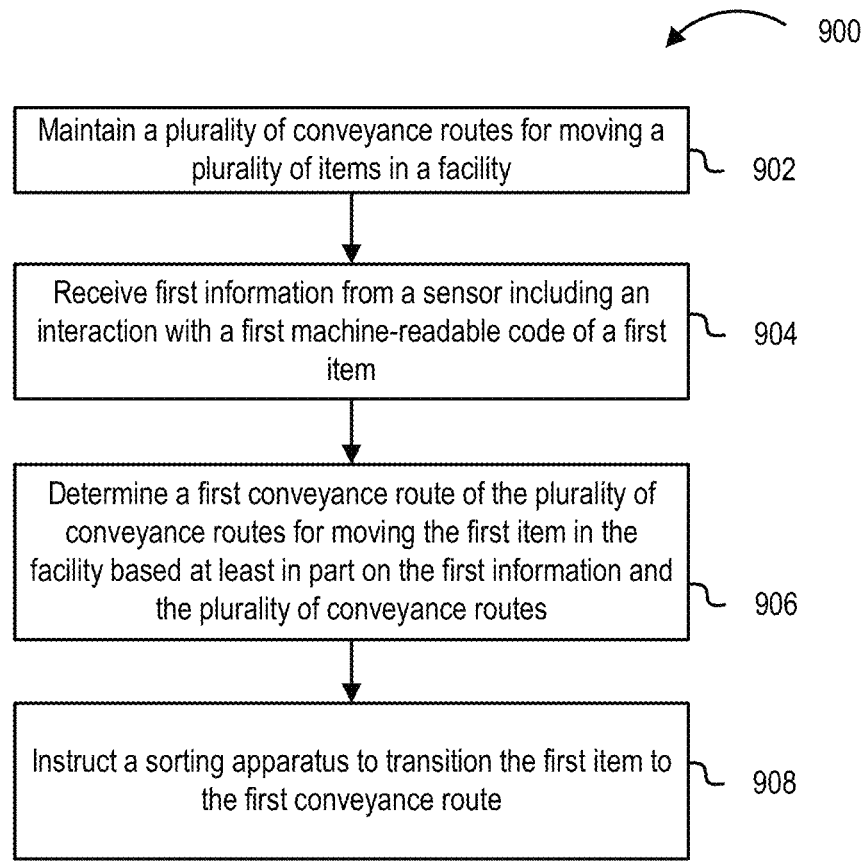
FIG. 9 illustrates an example flow diagram for an inventory conveyance feature, in accordance with embodiments.

FIGS. 8 and 9 illustrate example flow diagrams for move items in a facility in accordance with an inventory conveyance feature. Some or all of the processes 800 and 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At step 802 of FIG. 8, first information is received from a sensor, the first information including an interaction with a machine-readable code of a first item. In embodiments, the sensor may be associated with an inventory conveyance system configured to move a plurality of items via one or more conveyance mechanisms. In accordance with at least one embodiment, the machine-readable code comprises a fragility rating. The fragility rating may represent an amount of force that an item can withstand prior to damaging the item. The inventory conveyance system may include a robotic manipulator having at least two dimensions of freedom that is configured to grasp and move items to and from conveyance mechanisms in a facility. At step 804, a first movement rate for moving the first item from one or more conveyance mechanisms may be determined based at least in part on the first information.

At step 806, a robotic manipulator may be instructed to move the first item from the one or more conveyance mechanisms at a first movement rate. In embodiments, the first movement rate may result in a force exerted on the first item that is less than a tolerance level that can be withstood by the first item as represented or indicated by the fragility rating of the first item. At step 808, second information may be received from the sensor in response to an interaction with the machine-readable code of a second item. At step 810, a second movement rate may be determined for moving the second item from the one or more conveyance mechanisms based at least in part on the second information. In embodiments, the second movement rate may be different than the first movement rate. A step 812, the robotic manipulator may be instructed to move the second item from the one or more conveyance mechanisms at the second movement rate. For example, the robot manipulator may be instructed to move at a first speed (e.g., 0.25 MPH) to represent movement of a fragile item and avoid damaging the item in accordance to the item's corresponding fragility rating. To continue the example, the robot manipulator may be instructed to move at a second speed (e.g., 5 MPH) to represent movement of a durable item while still avoiding damaging the item in accordance to the item's corresponding fragility rating. In embodiments, the fragility rating may include a range of values or a tolerance band of values.

At step 902 of FIG. 9, a plurality of conveyance routes for moving a plurality of items in a facility may be maintained. In embodiments, a conveyance route of the plurality of conveyance routes comprises a subset of one or more conveyance mechanisms. The conveyance mechanisms of the subset may operate at different speeds than conveyance mechanisms of another subset. In accordance with at least one embodiment, an inventory conveyance system associated with the computer system maintain the plurality of conveyance routes may comprise a sensor for interacting with a machine-readable code of an item. The inventory conveyance system may be configured to move a plurality of items in a facility via one or more conveyance mechanisms. The machine-readable code may comprise a fragility rating. The fragility rating may represent an amount of force that the item withstands prior to damaging the item. The inventory conveyance system may further comprise a sorting apparatus that is configured to: receive at least a first item and a second item, and transitioning at least the first item and the second item to one of a plurality of conveyance routes for moving the plurality of items in the facility. In embodiments, the sorting apparatus may further be configured to receive at least a first inventory container and a second inventory container; and transitioning at least the first inventory container and the second inventory container to one of a plurality of conveyance routes for moving the plurality of items in the facility.

At step 904, first information from the sensor may be received in response to an interaction with a first machine-readable code of a first item. In embodiments, information may be received in response to the sensor interacting with first machine-readable codes of a first set of items stored in a first inventory container. At step 906, a first conveyance route of the plurality of conveyance routes for moving the first item may be determined based at least in part on the first information and the plurality of conveyance routes. In embodiments, a conveyance route of the plurality of conveyance routes may be determined for a first inventory container storing a plurality of items based on the machine-readable code of the first inventory container and plurality of conveyance routes. At step 908, the sorting apparatus may be instructed to transition the first item to the first conveyance route. In embodiments, the sorting apparatus may be instructed to transition the first inventory container to the first conveyance route. In accordance with at least one embodiment, the inventory conveyance system may further comprise one or more actuators for modulating a speed of movement or velocity of the one or more conveyance mechanisms. For example, a particular conveyance route may be instructed to modulate to a different speed based on instructions to associated actuators to avoid damaging the item being moved via the particular conveyance route in accordance with the item's fragility rating. In embodiments, the computer system may determine the particular speed of modulation or velocity for the one or more conveyance mechanisms or associated actuators based at least in part on the first machine-readable code of a first item or based on first machine-readable codes of the first set of items stored in the first inventory container. The computer system may determine the particular speed of modulation or velocity based on the lowest fragility rating of an item in the first set of items representing an imposed limit to not move faster than the limits indicated by the most fragile item included in the first set of items. In accordance with at least one embodiment, the first inventory container may be associated or assigned a machine-readable code that comprises a particular fragility rating. Instructions may be provided to only store items within the first inventory container that have similar or greater fragility ratings to avoid damaging any items that may be stored together within the first inventory container.

Figure 10:
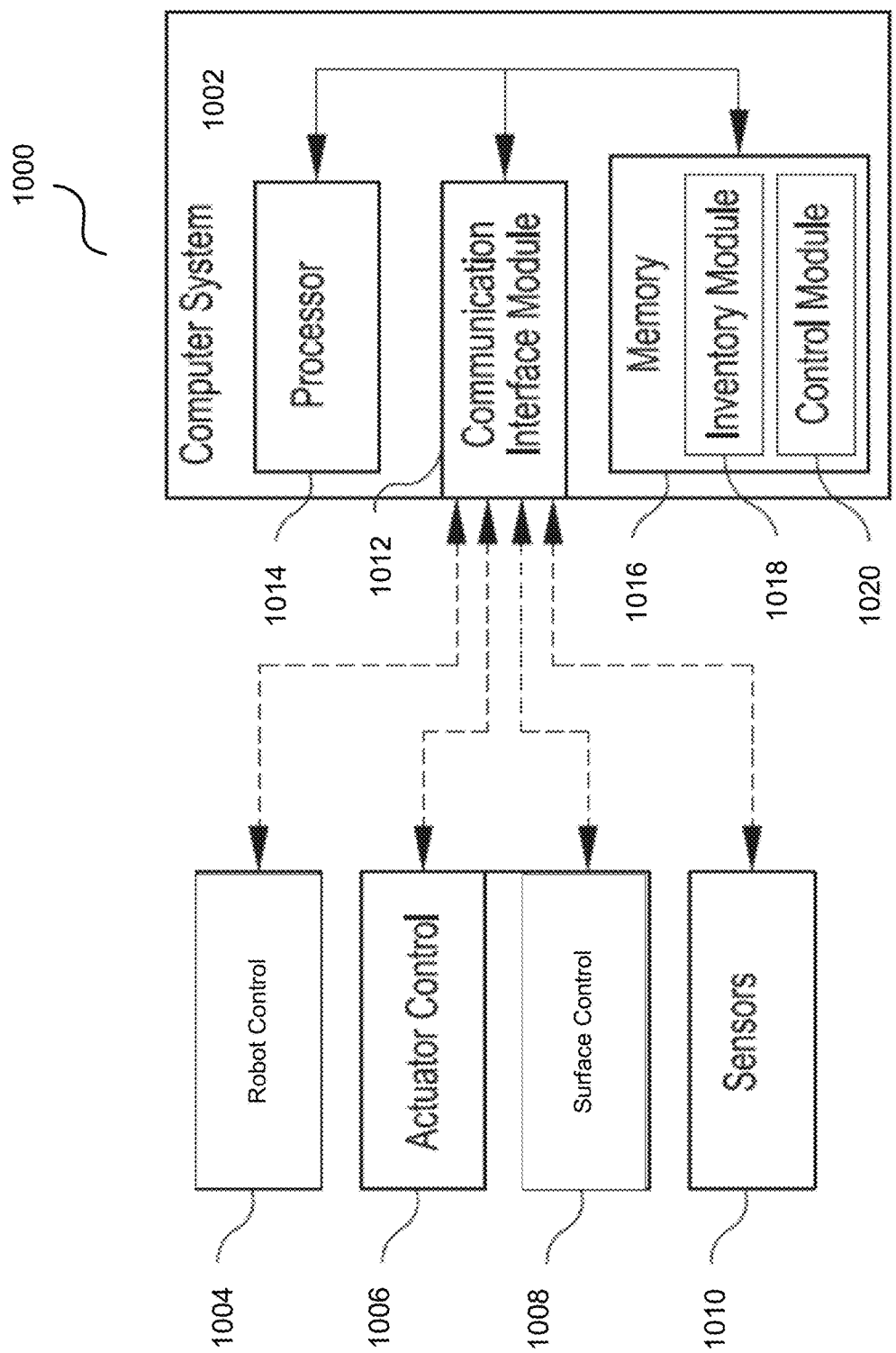
FIG. 10 depicts a block diagram illustrating components of an inventory conveyance system, in accordance with embodiments.

FIG. 10 depicts a block diagram illustrating components of an inventory conveyance system, in accordance with embodiments. As shown in FIG. 10, the inventory conveyance system 1000 includes a computer system 1002, a robot control 1004, an actuator control 1006, a surface control 1008, and sensors 1010. The computer system 1002 may be an example of an inventory conveyance system described elsewhere herein. In embodiments, the inventory conveyance system 1000 may include a computer system, such as computer system 1002. In general, the computer system 1002 may function as a controller that controls other components of the inventory conveyance system 1000, for example, as described further below.

The robot control 1004 may correspond to motors, structures, grasping elements or other elements capable of grasping, holding, or otherwise moving items or inventory containers to and from conveyance mechanisms. This may include elements that may affect how the items or inventory containers are grasped or moved and/or elements that may affect a speed or other characteristic of how the items or inventory containers are moved to or from conveyance mechanisms. The actuator control 1006 may correspond to actuators or other elements capable of adjusting an alignment of a robotic manipulator or a sorting mechanism, as well as the speed or velocity of the robotic manipulator or sorting mechanism. The surface control 1008 may correspond to motors, actuators, or other elements capable of adjusting the speed or velocity or other functionality of one or more conveyance mechanism a conveyance route in a facility. The sensors 1010 may include optical sensors, pressure sensors, RFID readers, Bluetooth bases, or NFC receivers/transmitters, other wireless communication sensors, or any other sensors that may be configured for interacting with a machine-readable code of an item or inventory container. In embodiments, the sensors 1010 may obtain information about items, inventory containers, or other elements of the inventory conveyance system 1000, which may include information about speed (e.g., of conveyance mechanisms, items, inventory containers, robotic manipulators, sorting mechanisms, etc.) or any other conditions or state information about components of the inventory conveyance system 1000. The robot control 1004, actuator control 1006, surface control 1008, and the sensors 1010 may function as appropriate inputs and/or outputs for control of the inventory conveyance system 1000 by the computer system 1002. The computer system 1002 may be an example of computer system 606 or 714 of FIGS. 6 and 7.

The illustrated computer system 1002 includes a communication interface module 1012, a processor 1014, a memory 1016, an inventory module 1018, and a control module 1020. The computer system 1002 may represent a single component, multiple components located at a central location within the inventory conveyance system 1000, or multiple components distributed throughout the inventory conveyance system 1000. In general, computer system 1002 may include any appropriate combination of hardware and/or software suitable to provide the described functionality.

Processor 1014 is operable to execute instructions associated with the functionality provided by computer system 1002. Processor 1014 may comprise one or more general purpose computers, dedicated microprocessors, or other processing devices capable of communicating electronic information. Examples of processor 1014 include one or more application-specific integrated circuits (ASICs), field programmable gate arrays (FPGAs), digital signal processors (DSPs), and any other suitable specific or general purpose processors.

Memory 1016 stores processor instructions, inventory requests, state information for the various components of inventory conveyance system 1000 and/or any other appropriate values, parameters, or information utilized by computer system 1002 during operation. Memory 1016 may represent any collection and arrangement of volatile or nonvolatile, local or remote devices suitable for storing data. Examples of memory 1016 include, but are not limited to, random access memory (RAM) devices, read only memory (ROM) devices, magnetic storage devices, optical storage devices, or any other suitable data stores devices.

Communication interface module 1012 facilitates communication between computer system 1002 and other components of inventory conveyance system 1000, including information and/or instructions conveyed between any of the robot control 1004, actuator control 1006, surface control 1008, sensors 1010, inventory module 1018, and control module 1020. These communications may represent communication of any form appropriate based on the capabilities of computer system 1002 and may include any suitable information. Depending on the configuration of computer system 1002, communication interface module 1012 may be responsible for facilitating either or both of wired and wireless communication between computer system 1002 and the various components of inventory conveyance system 1000. In particular embodiments, computer system 1002 may communicate using communication protocols such as 802.11, Bluetooth, or Infrared Data Association (IrDA) standards.

In general, the inventory module 1018, the control module 1020, and the communication interface module 1012 may each represent any appropriate hardware and/or software suitable to provide the described functionality. In addition, as noted above, computer system 1002 may, in particular embodiments, represent multiple different discrete components and any or all of the inventory module 1018, the control module 1020, and the communication interface module 1012 may represent components physically separate from the remaining elements of computer system 1002. Moreover, any two or more of the inventory module 1018, the control module 1020, and the communication interface module 212 may share common components. For example, in particular embodiments, the inventory module 1018 and the control module 1020 represent computer processes executing on processor 1014 and communication interface module 1012 comprises a wireless transmitter, a wireless received, and a related computer process executing on processor 1014.

The inventory module 1018 may determine conditions present in the inventory conveyance system 1000, track inventory requests, and/or determine objectives for the inventory conveyance system 1000. For example, the inventory module 1018 may determine (e.g., based on information from sensors 1010) which items are stored in which inventory containers. The inventory module 1018 may also determine targets (e.g., a target item within a particular inventory container or inventory holder, a target inventory container having a particular item, a target station, inventory container, area, or location in a facility designated to receive a target item from an inventory container or conveyance mechanism). The inventory module 1018 may also determine the state of other elements within the inventory conveyance system 1000, such as a speed, alignment, or orientation of a robotic manipulator, conveyance mechanism, sorting mechanism, actuator, item, or inventory container. The inventory module 1018 may also maintain and update one or more conveyance routes for moving items or inventory containers from one location within a facility to another location within the facility including speed of conveyance mechanisms or other elements of the conveyance route that are appropriate given the fragility rating of the item or inventory container.

The control module 1020 may control components within the inventory conveyance system 1000. For example, the control module 1020 may send comments to the robot control, the actuator control 1006, the surface control 1008, and the sensors 1010 to control respective components of the inventory conveyance system 1000. In various embodiments, the control module 1020 may control components based on information provided by the inventory module 1018. For example, based on designated targets and relative location of those targets identified by the inventory module 1018, the control module 1020 may activate an actuator via actuator control 1006 to change a state of a robotic manipulator or conveyance mechanism to cause a transfer or movement of items to a particular location within a facility. The control module 1020 may implement other changes based on the inventory module 1018 determining other actions may be warranted to move other elements to suitable locations (such as adjusting a conveyance mechanism speed, adjusting an orientation of an item or inventory container via a robotic manipulator, sorting items to various and different conveyance routes via a sorting mechanism, or controlling other elements of the inventory management system 1000).

As an illustrative example, the inventory module 1018 may determine, from a plurality of items stored in a facility, a target item, a target destination for the item, and a target conveyance route to utilize for conveying the target item to the target destination which includes modulating the speed of operating or movement conducted by components along the target conveyance route. This may include determining an inventory container to receive the target item. Based on such determinations, the control module 1020 may cause actuation of particular actuators for a robotic manipulator, a conveyance mechanism, or a sorting mechanism to move the target item to the target destination using a target conveyance route for storage in the inventory container. For example, the inventory container may be located in a shipping location of the facility where the item will undergo further operations to package the item for eventual shipping to an order destination.

Figure 11:
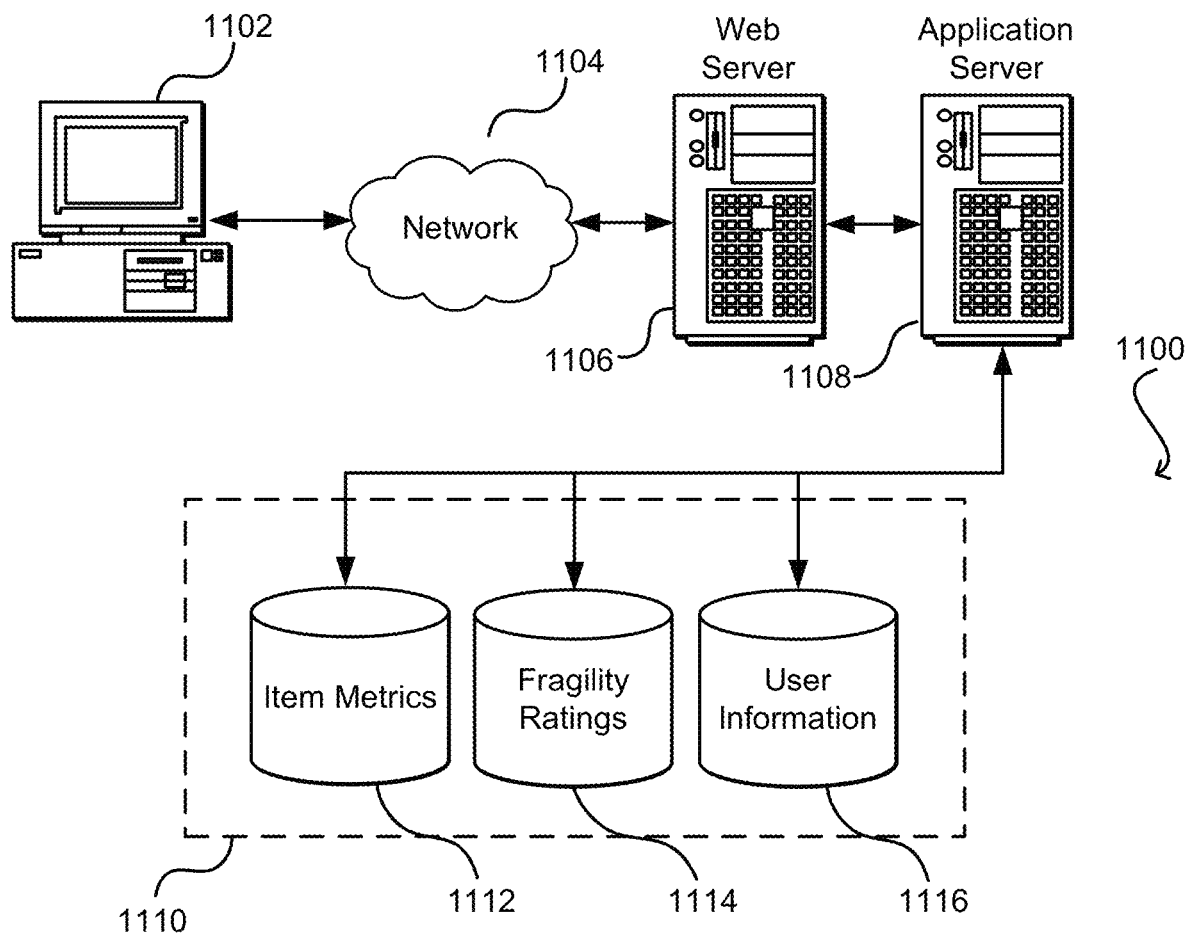
FIG. 11 illustrates an environment in which various embodiments can be implemented.

FIG. 11 illustrates a system 1100 and aspects of an example environment for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 1108 can include any appropriate hardware and software for integrating with the data store as needed to execute aspects of one or more applications for the client device, handling a majority of the data access and business logic for an application. The application server 1108 provides access control services in cooperation with the data store and is able to generate content such as text, graphics, audio, and/or video to be transferred to the user, which may be served to the user by the Web server 1106 in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server 1106. It should be understood that the Web and application servers (1106 and 1108, respectively) are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing item metrics 1112 and user information 1116, which can be used to serve content for the production side, assign or associate fragility ratings to items, generate fragility ratings, generate machine-readable codes that include a fragility rating for an item, or other tasks described herein of the inventory conveyance features. The data store also is shown to include a mechanism for storing fragility ratings 1114, which can be used for reporting, analysis, or other such purposes such as determining a fragility rating for an item not already associated with a fragility rating, or generating instructions for modulating movement or velocity utilized by components of an inventory conveyance system to move or transfer inventory within a facility. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    an inventory conveyance system configured to move a plurality of items via one or more conveyance mechanisms;
    a sensor for interacting with a machine-readable code of an item of the plurality of items, the machine-readable code associated with a fragility rating that represents an amount of force that the item withstands prior to damaging the item;
    a robotic manipulator having at least two dimensions of freedom and configured to grasp at least a first item and a second item; and
    a computer system configured to:
        receive first information from the sensor including an interaction with the machine-readable code of the first item, the first information including the fragility rating for the first item;
        determine a first movement rate for moving the first item from the one or more conveyance mechanisms based at least in part on the fragility rating of the first item from the first information;
        instruct the robotic manipulator to move the first item from the one or more conveyance mechanisms at the first movement rate;
        receive second information from the sensor including the interaction with the machine-readable code of the second item, the second information including the fragility rating for the second item;
        determine a second movement rate for moving the second item from the one more conveyance mechanisms based at least in part on the fragility rating of the second item from the second information, the second movement rate being different than the first movement rate; and instruct the robotic manipulator to move the second item from the one or more conveyance mechanisms at the second movement rate.

2. The system of claim 1, wherein the fragility rating includes a range of values that each correspond to a different amount of force.

3. The system of claim 1, wherein the computer system is further configured to generate a queue time based at least in part on the fragility rating of the first item and the fragility rating of the second item, the queue time utilized to restrict movement to and from the one or more conveyance mechanisms.

4. The system of claim 3, wherein the computer system is further configured to instruct the robotic manipulator to move the second item from the one or more conveyance mechanisms upon expiration of the queue time.

5. A computer-implemented method, comprising:
maintaining, by a computer system, first information about a plurality of items, each of the plurality of items having one of a plurality of fragility ratings associated therewith, a fragility rating of the plurality of fragility ratings representing an amount of force that a corresponding item of the plurality of items withstands prior to damaging the item;
maintaining, by the computer system, second information about the plurality of items, the second information comprising item metrics for the corresponding item of the plurality of items;
receiving, by the computer system, an indication of a new item, the new item not associated with one of the plurality of fragility ratings;
obtaining, by the computer system, the item metrics for the new item based at least in part on the indication; and
determining, by the computer system, the fragility rating for the new item based at least in part on the item metrics for the new item, the first information, and the second information.

6. The computer-implemented method of claim 5, wherein the item metrics include one or more of a weight of an item of the plurality of items, dimensions of the item, material composition of the item, packaging of the item, an item category of the item, or density of the item.

7. The computer-implemented method of claim 5 further comprising generating, by the computer system, a machine-readable code that comprises the determined fragility rating for the new item.

8. The computer-implemented method of claim 7, further comprising transmitting, by the computer system, instructions for printing the machine-readable code on the new item.

9. The computer-implemented method of claim 7, further comprising updating, by the computer system, the second information to include the item metrics for the new item and the first information to include the determined fragility rating for the new item.

10. The computer-implemented method of claim 5, further comprising:
obtaining, by the computer system, third information that includes test data, the test data indicating an actual amount of force the new item withstands prior to sustaining damage; and
updating, by the computer system, the fragility rating for the new item based at least in part on the third information.

11. The computer-implemented method of claim 5, further comprising generating, by the computer system, instructions for storing the new item with other items in a facility based at least in part on the fragility rating for the new item and fragility ratings of the other items.

12. The computer-implemented method of claim 5, further comprising generating, by the computer system, instructions for storing a set of items for conveyance through a facility in response to receiving an order for the set of items and corresponding fragility ratings for the set of items.

13. The computer-implemented method of claim 12, further comprising generating, by the computer system, packaging for the set of items based at least in part on the corresponding fragility ratings for the set of items.

14. An inventory system, comprising:
an inventory conveyance system configured to move a plurality of items in a facility via one or more conveyance mechanisms;
a sensor for interacting with a machine-readable code of an individual item of the plurality of items, the machine-readable code comprising a fragility rating that represents an amount of force that the individual item withstands prior to damaging the individual item;
a sorting apparatus configured to:
receive at least a first item of the plurality of items and a second item of the plurality of items; and
transition at least the first item and the second item to one of a plurality of conveyance routes for moving the plurality of items in the facility; and
a computer system configured to:
maintain the plurality of conveyance routes for moving the plurality of items in the facility, a conveyance route of the plurality of conveyance routes comprising a subset of the one or more conveyance mechanisms, the subset of the one or more conveyance mechanisms operating at different speeds;
receive first information from the sensor including an interaction with a first machine-readable code of the first item;
determine a first conveyance route of the plurality of conveyance routes for moving the first item in the facility based at least in part on the first information and the plurality of conveyance routes; and
instruct the sorting apparatus to transition the first item to the first conveyance route.

15. The inventory system of claim 14, further comprising one or more actuators for modulating a speed of movement of the one or more conveyance mechanisms.

16. The inventory system of claim 15, wherein the computer system is further configured to determine a particular speed of modulation for the one or more conveyance mechanisms based at least in part on the first machine-readable code of the first item.

17. The inventory system of claim 16, wherein the computer system is further configured to instruct the one or more actuators to modulate the speed of movement of the one or more conveyance mechanisms in accordance with the determined particular speed of modulation.

18. The inventory system of claim 14, wherein the computer system is further configured to:
receive second information from the sensor including an interaction with a second machine-readable code of the second item;
determine a second conveyance route of the plurality of conveyance routes for moving the second item in the facility based at least in part on the second information and the plurality of conveyance routes, the second conveyance route different than the first conveyance route; and instruct the sorting apparatus to transition the second item to the second conveyance route.

19. The inventory system of claim 14, wherein the sorting apparatus is further configured to receive at least a first inventory container and a second inventory container, the first inventory container and the second inventory container configured to store the plurality of items, and wherein determining, by the computer system, the first conveyance route is further based at least in part on a particular fragility rating of a set of fragility ratings that correspond to a first set of items stored in the first inventory container, the particular fragility rating being less than other fragility ratings of the set of the fragility ratings of the first set of items.

20. The inventory system of claim 19, wherein the first inventory container and the second inventory container may be associated with machine-readable codes that comprise a particular fragility rating for the plurality of items stored therein.

* * * * *